United States Patent
Fitzpatrick, Jr. et al.

(10) Patent No.: US 9,194,766 B2
(45) Date of Patent: Nov. 24, 2015

(54) MULTI-PURPOSE GAUGE FOR HUB-PILOTED WHEEL INSPECTION

(71) Applicants: Richard T. Fitzpatrick, Jr., Livonia, MI (US); Ted A. Schiebold, Taylor, MI (US)

(72) Inventors: Richard T. Fitzpatrick, Jr., Livonia, MI (US); Ted A. Schiebold, Taylor, MI (US)

( * ) Notice: Subject to any disclaimer, the term of this patent is extended or adjusted under 35 U.S.C. 154(b) by 121 days.

(21) Appl. No.: 14/199,431

(22) Filed: Mar. 6, 2014

(65) Prior Publication Data
US 2015/0253222 A1    Sep. 10, 2015

(51) Int. Cl.
*G01M 17/013* (2006.01)
*G01B 5/08* (2006.01)
*G01B 5/12* (2006.01)

(52) U.S. Cl.
CPC .............. *G01M 17/013* (2013.01); *G01B 5/08* (2013.01); *G01B 5/12* (2013.01)

(58) Field of Classification Search
CPC .......... G01B 5/12; G01B 5/08; G01M 17/013
USPC .................. 33/1 BB, 501.05, 501.08, 501.09, 33/501.45, 600, 203
See application file for complete search history.

(56) References Cited

U.S. PATENT DOCUMENTS

| | | | | | |
|---|---|---|---|---|---|
| 2,517,319 | A | * | 8/1950 | Jenkin ...................... | G01B 3/26 33/501.45 |
| 2,715,281 | A | * | 8/1955 | Black ...................... | G01B 5/08 33/501.45 |
| 3,207,557 | A | * | 9/1965 | Hunter ...................... | B60B 3/14 29/406 |
| 4,129,950 | A | * | 12/1978 | Weinhaus ................ | G01B 5/08 33/203.19 |
| 4,211,241 | A | * | 7/1980 | Kaster .................... | A61F 2/2427 33/512 |
| 4,219,937 | A | * | 9/1980 | Lorenzini ................ | G01B 3/46 33/544.3 |
| 5,042,161 | A | * | 8/1991 | Hodge ................. | A61B 5/1076 33/501.45 |
| 5,197,465 | A | * | 3/1993 | Montgomery .... | A61M 16/0472 128/200.26 |
| 5,253,427 | A | * | 10/1993 | Bartlett .................... | G01B 3/30 33/501.08 |
| 6,070,946 | A | * | 6/2000 | Holmes ................... | B60B 11/06 301/35.627 |
| 6,904,690 | B2 | * | 6/2005 | Bakke ...................... | G01B 3/42 33/1 H |
| 7,073,272 | B1 | * | 7/2006 | Lefebvre ............ | B62D 53/0842 33/1 BB |
| 2015/0226534 | A1 | * | 8/2015 | Rodriguez ............... | G01B 3/38 33/501.45 |

* cited by examiner

*Primary Examiner* — Christopher Fulton
(74) *Attorney, Agent, or Firm* — Quinn Law Group, PLLC

(57) ABSTRACT

A multi-purpose gauge for inspecting a hub-piloted wheel assembly includes a first cylindrical section having a first diameter (d1); a second cylindrical section having a second diameter (d2); and a third cylindrical section having a third diameter (d3). The third cylindrical section defines both an end of the gauge and a cylindrical bore having an inner diameter (id). The second cylindrical section is disposed between the first cylindrical section and the third cylindrical section. Additionally, the first diameter is smaller than the second diameter, which in turn is smaller than the third diameter; and the inner diameter is greater than the first diameter.

10 Claims, 4 Drawing Sheets

MULTI-PURPOSE GAUGE FOR HUB-PILOTED WHEEL INSPECTION

TECHNICAL FIELD

The present invention relates generally to an inspection gauge for a hub-pilot wheel system.

BACKGROUND

In commercial trucking applications, wheels may be properly aligned on a hub using either specially designed mounting hardware, or through the geometry of the hub itself. These two designs are respectively referred to as stud-piloted wheel mounting, and hub-piloted wheel mounting. In a stud-piloted wheel, the studs that are used to secure the wheel also serve to align the wheel on the hub. In this design, ball-seat cap nuts fit into chamfered ball-seats provided in the bolt-hole openings of the wheel to position the wheel. In a dual wheel hub, additional hardware is required to properly position both the inner and outer wheel. More specifically, a ball-seat inner barrel nut between the wheels serves as both a nut for the inner wheel, and a stud for the outer wheel.

Hub-piloted, also known as "unimount" disc wheels are designed to center on the hub at the center hole or bore of the wheel. The wheel center hole locates the wheel on pilots built into the hub. Hub-piloted wheels are used with flange nuts which flushly contact the flat wheel disc face around the bolt-hole. Only one nut on each stud is used to fasten single or dual wheels to a vehicle. Hub-piloted wheels have straight through bolt-holes with no ball seat.

Ensuring that a wheel is properly secured to the hub is of critical importance. This requires that each nut be properly torqued onto the stud within a narrow tolerance range. Over tightening the nut may result in damage to the stud, such as compromised threads, plastic deformation of the stud, or ultimate failure/sheering. Likewise, under tightening the nut may result in wheel movement or "indexing," with the nut eventually backing off and the wheel becoming unsecured.

SUMMARY

A multi-purpose gauge for inspecting a hub-piloted wheel assembly includes a first cylindrical section having a first diameter (d1); a second cylindrical section having a second diameter (d2); and a third cylindrical section having a third diameter (d3). The third cylindrical section defines both an end of the gauge and a cylindrical bore having an inner diameter (id). The second cylindrical section is disposed between the first cylindrical section and the third cylindrical section. Additionally, the first diameter is smaller than the second diameter, which in turn is smaller than the third diameter; and the inner diameter is greater than the first diameter.

In one configuration, a quick disconnect feature may be disposed in selective communication with the first cylindrical section. This may allow a technician to removably attach the gauge from, for example, a key ring.

When intended for use with heavy-duty trucks, such as those that use M22×1.5 sized wheel studs, d1 may be from about 20.676 mm to about 20.727 mm; d2 may be from about 25.883 mm to about 25.984 mm; d3 may be from about 26.988 mm to about 27.026 mm; and id may be from about 21.694 mm to about 21.732 mm. The gauge may further include an indicia provided in an outer surface of the first cylindrical section. The indicia is separated from an end of the first cylindrical section by a distance (a) that is from about 5.33 mm to about 6.10 mm.

When intended for use with medium-duty trucks, such as those that use M20×1.5 sized wheel studs, d1 may be from about 18.676 mm to about 18.727 mm; d2 may be from about 25.883 mm to about 25.984 mm; d3 may be from about 26.988 mm to about 27.026 mm; and id may be from about 19.694 mm to about 19.732 mm. The provided indicia may then be separated from the end of the first cylindrical section by a distance (a) that is from about 5.33 mm to about 6.10 mm.

In an additional embodiment of the present invention, a method of inspecting a truck wheel includes: determining if a wheel stud is under-diameter; determining if a wheel nut is over-diameter; determining if a wheel nut is bell-mouthed; and determining if a bolt-hole opening in a wheel is eccentric and/or is obstructed by foreign material. Determining that the wheel stud is under-diameter may include inserting a distal end portion of the wheel stud into a bore provided in a multi-purpose gauge. Determining that a wheel nut is over-diameter may include inserting a first section of the multi-purpose gauge into a first side of the wheel nut. Determining that a wheel nut is bell-mouthed may include inserting the first section of the multi-purpose gauge into a second side of the wheel nut. Finally, determining that a bolt-hole opening in a wheel is eccentric or is obstructed may include inserting a second section of the multi-purpose gauge into the bolt-hole opening.

Finally, in still another embodiment, a multi-purpose gauge for inspecting a hub-piloted wheel assembly includes a unitary body having: means for determining a under-dimension of a wheel stud; means for determining an over-dimension of a wheel nut; means for determining bell-mouthing of a wheel nut; and means for determining if a bolt-hole opening in a wheel is eccentric or is obstructed.

The above features and advantages and other features and advantages of the present invention are readily apparent from the following detailed description of the best modes for carrying out the invention when taken in connection with the accompanying drawings.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

DETAILED DESCRIPTION

Figure 1:
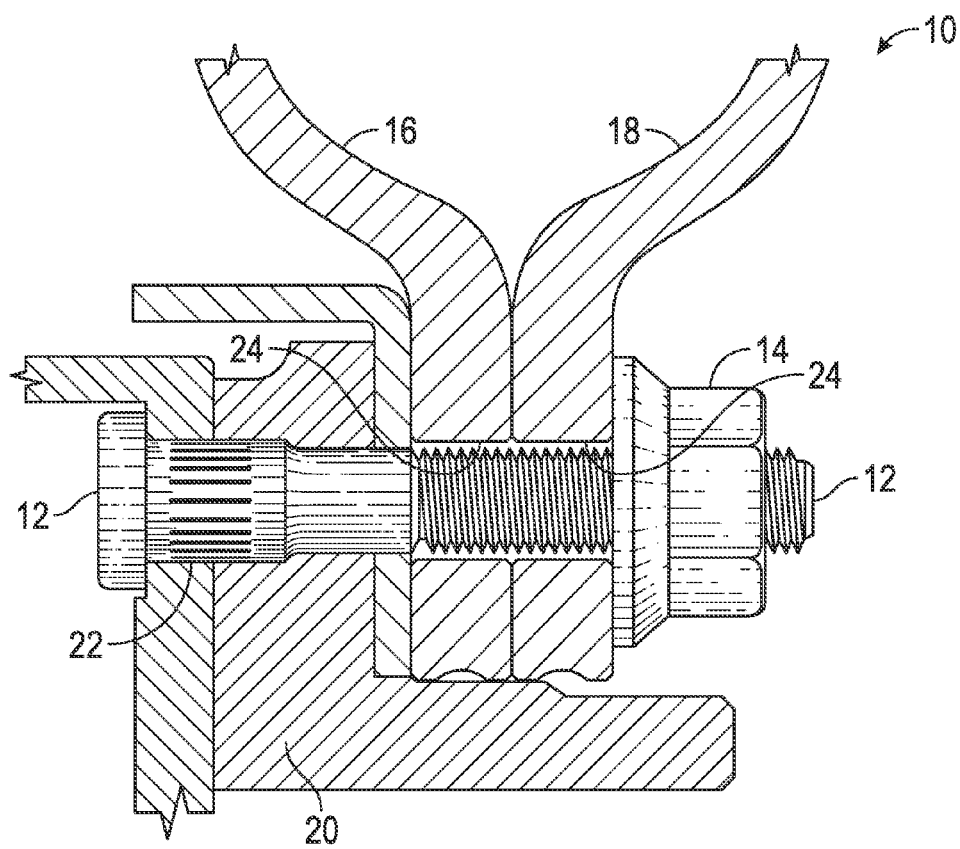
FIG. 1 is a schematic partial cross-sectional view of a stud and nut being used to secure two wheels to a hub in a hub-piloted wheel assembly

Referring to the drawings, wherein like reference numerals are used to identify like or identical components in the various views, FIG. 1 schematically illustrates a hub-piloted wheel assembly 10. As shown, a wheel stud 12 and a wheel nut 14 cooperate to secure a first wheel 16 and a second wheel 18 to a wheel hub 20. In typical applications, the wheel stud 12 is a threaded bolt, that is secured into the hub 20 through, for example, the use of a knurled portion 22. The wheel stud 12 extends through a bolt-hole opening 24 in each of the first wheel 16 and the second wheel 18, where the wheel nut 14 applies a compressive load directly to the second wheel 18. The wheel nut 14 is typically a flanged, flat bottom nut that is tightened to a predetermined torque.

In heavy duty trucking applications (i.e., Class 7 or 8 trucks as specified by the U.S. Federal Highway Administration), the wheel stud 12 is typically an M22×1.5 sized bolt, and ten such wheel studs 12 may be used to secure the wheels 16, 18 to the hub 20. In these applications, the wheel nut 14 may be torqued against the second wheel 18 to a torque of, for example, from about 610 to about 678 N-m. In medium duty trucking applications (i.e., Class 5 or 6 trucks), the studs may include M20×1.5 bolts, and in even lighter duty applications M18×1.5 or M16×1.5 bolts may be used.

Particularly in heavy duty applications, due to the extreme force that is used to secure the wheels 16, 18 to the hub 20, it is critically important that both the studs 12 and nuts 14 are properly dimensioned. If a stud 12 is under dimensioned, or if a nut 14 is over dimensioned, excess forces may be developed that could result in damage to either the nut 14 or the stud 12, which may compromise the integrity of the wheel assembly 10.

Figure 2:
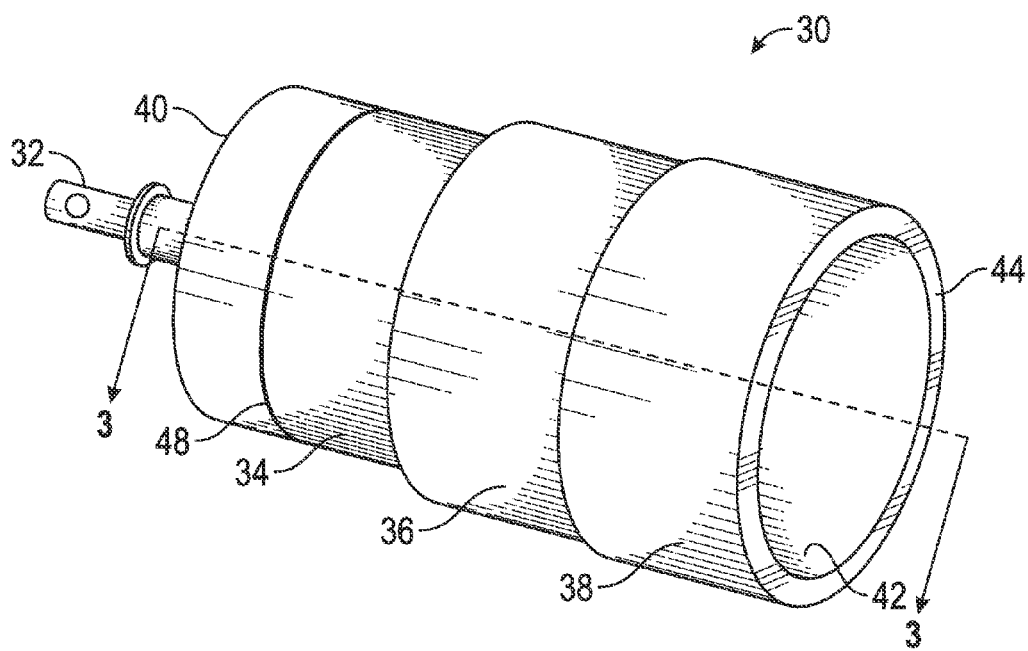
FIG. 2 is an isometric view of a multi-purpose gauge for a hub-piloted wheel assembly.

FIG. 2 illustrates a multipurpose gauge 30 that may be used by a wheel technician to quickly assess whether each stud 12 and nut 14 are properly dimensioned, as well as whether the bolt-hole opening 24 in each wheel 16, 18 is both round, and not oversized. The gauge 30 has a unitary body and may include a quick disconnect feature 32 that allows the technician to carry the gauge 30 on a key ring, such that it can be available at all times.

The gauge 30 is preferably made from a resilient material that can resist both deformation and wear (i.e., the type of deformation/wear that may be experienced through repeated use or through impacts with other objects). Additionally, it is preferable that the material be selected so that it maintains applicable tolerances throughout a usable temperature range of about −30 degrees C., to about 50 degrees C. Suitable materials may include alloys of steel or aluminum. It is also preferable that the gauge 30 be made from a material that resists corrosion when exposed to harsh environments. For example, alloys of stainless steel may be used, or the gauge 30 may be anodized following its initial fabrication.

As further illustrated in FIG. 2, the gauge 30 may include three distinct cylindrical sections 34, 36, 38 having progressively larger outer diameters. The quick disconnect feature 32 may be provided in a first end 40 of the gauge 30 that is adjacent to the first cylindrical section 34, while a bore 42 may be provided in a second end 44 of the gauge 30 (i.e., opposite the first end 40) that is adjacent to the third cylindrical section 38.

Figure 3:
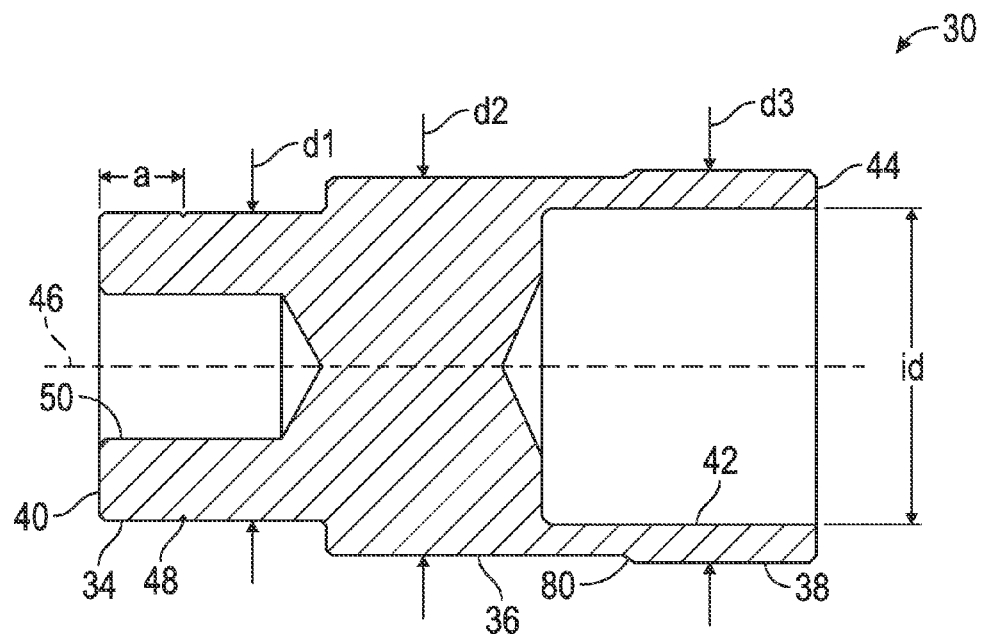
FIG. 3 is a cross-sectional view of the gauge of FIG. 2 taken along line 3-3.

FIG. 3 provides a cross-sectional view of the gauge 30 for enhanced clarity. As illustrated in FIG. 3, the first section 34 may have a first outer diameter d1, the second section 36 may have a second outer diameter d2, and the third section 38 may have a third outer diameter d3, where d1<d2<d3. Additionally, each section 34, 36, 38 may be aligned along a common longitudinal axis 46. As will be discussed below, the diameters d1, d2, d3 maybe selected according to the sizing of the wheel nuts 14 and bolt-hole openings 24. Additionally, the bore 42 may have a controlled inner diameter id based on the sizing of the wheel studs 12, where id>d1. Finally, an indicia 48, such as a scribe line 48 may be provided on an outer surface of the first section 36 at a distance a measured from the first end 40. While the first end 40 need not be entirely planar and/or transverse to the longitudinal axis 46, the distance a to the scribe line 48 is measured from a point proximate the first end 40 at which the first section 34 initially tapers to a diameter that is less than the prescribed first outer diameter d1. As additionally illustrated, a smaller bore 50 may be provided in the first end 40 of the first section 34 to receive the quick disconnect feature 32.

Table 1 below provides examples of max/min dimensions for each of d1, d2, d3, id, and a, for gauges that are intended to be used with each of the different heavy, medium, and light duty trucking applications described above.

TABLE 1

| Max/min gauge dimensions in mm according to application and stud size | | | | |
|---|---|---|---|---|
| | Heavy Duty M22 × 1.5 | Medium Duty M20 × 1.5 | Light Duty M18 × 1.5 | Light Duty M16 × 1.5 |
| d1 | 20.727/20.676 | 18.727/18.676 | 16.727/16.627 | 14.727/14.676 |
| d2 | 25.984/25.883 | 25.984/25.883 | 25.984/25.883 | 25.984/25.883 |
| d3 | 27.026/26.988 | 27.026/26.988 | 27.026/26.988 | 27.026/26.988 |
| id | 21.732/21.694 | 19.732/19.694 | 17.732/17.964 | 15.732/15.694 |
| a | 6.10/5.33 | 6.10/5.33 | 6.10/5.33 | 6.10/5.33 |

The gauge 30 may have five separate functionalities, as schematically illustrated in FIGS. 4-8. More specifically, the gauge 30 may be used to: determine if a wheel stud 12 is under-diameter, such as generally shown at 60 in FIG. 4; determine if a wheel nut 14 is over-diameter, such as generally shown at 62 in FIG. 5; determine if a wheel nut 14 is bell-mouthed, such as generally shown at 64 in FIG. 6; determine if a bolt-hole opening 24 is eccentric or is obstructed, such as generally shown at 66 in FIG. 7; and determine if a bolt-hole opening 24 is oversized, such as generally shown at 68 in FIG. 8.

Figure 4:
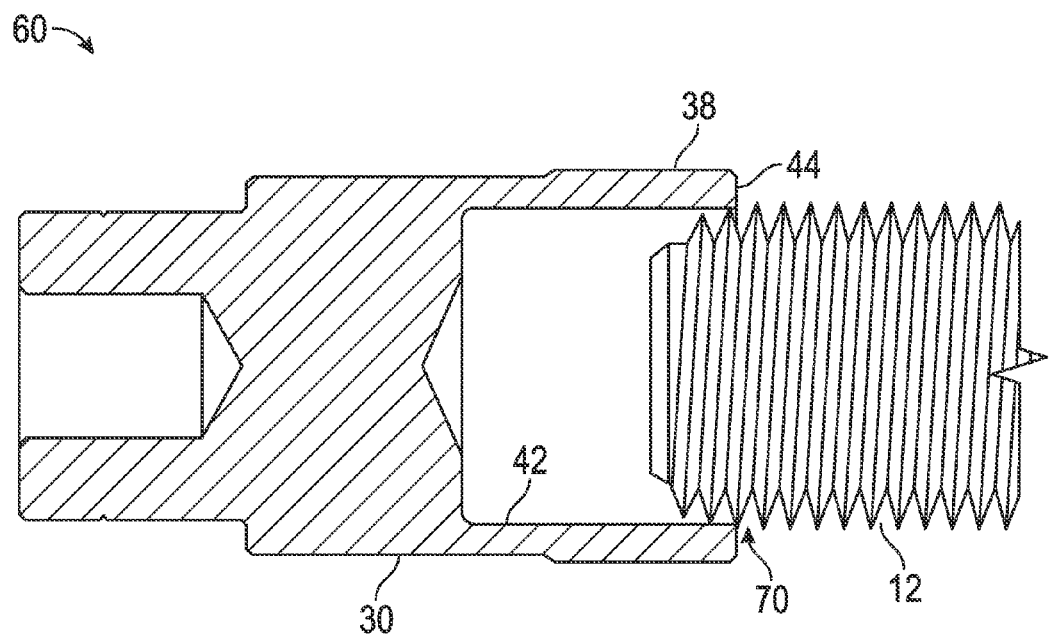
FIG. 4 is a schematic partial cross-sectional view of a multi-purpose gauge for a hub-piloted wheel assembly being used to determine if a wheel stud is under-diameter.

Referring to FIG. 4, the gauge 30 may be used to determine if a wheel stud 12 is under-diameter by attempting to insert the distal end 70 of the wheel stud 12 into the bore 42 provided in the end 44 of the third section 38. If more than about four threads enter the bore 42, then the stud 12 may be regarded as under-diameter. More specifically, under-diameter is a condition where the major diameter (i.e., a diameter measured from radially outward peaks of the threads) is below a minimum diameter specification. This condition can contribute to galling and may reduce the torque or clamp load that can be applied through the nut 14, which may result in wheel loosening, damage, or separation.

Figure 5:
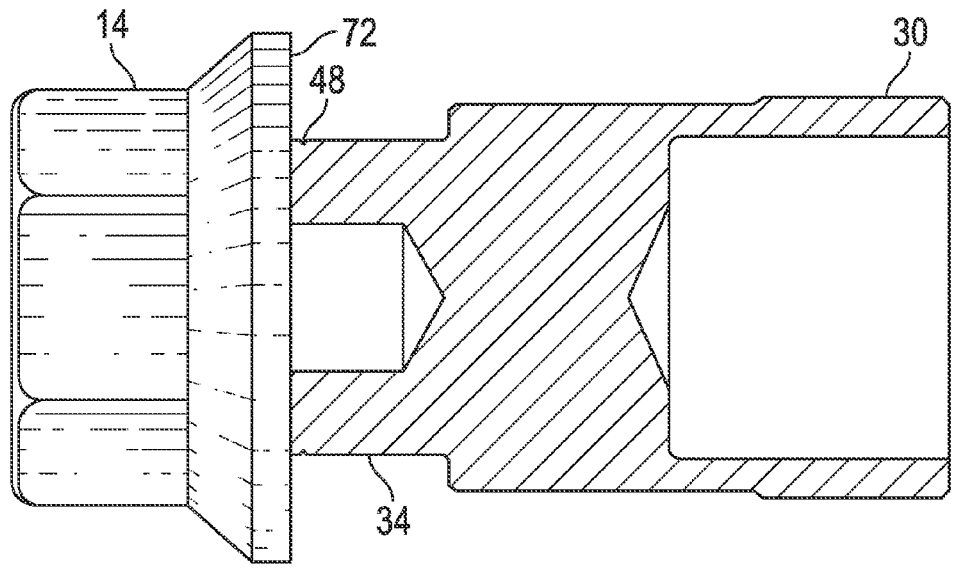
FIG. 5 is a schematic partial cross-sectional view of a multi-purpose gauge for a hub-piloted wheel assembly being used to determine if a wheel nut is over-diameter.

As shown in FIG. 5, the gauge 30 may be used to determine if a wheel nut 14 is over-diameter by attempting to insert the first section 34 of the gauge 30 into the flange-side 72 of the wheel nut 14. If the gauge 30 enters the threaded section of the nut 14 deeper than the scribe line 48, then the nut 14 may be regarded as over-diameter. Over-diameter is a condition where the minor diameter (i.e., a minimum interior diameter of the nut 14, measured from the radially inward peaks of the threads) is greater than a maximum diameter specification. This may be caused through wear or improper manufacturing. An over-diameter nut 14 may cause galling and/or damage to the threads, which may result in wheel loosening, damage, or separation and/or may require the nut to be ultimately cut off.

Figure 6:
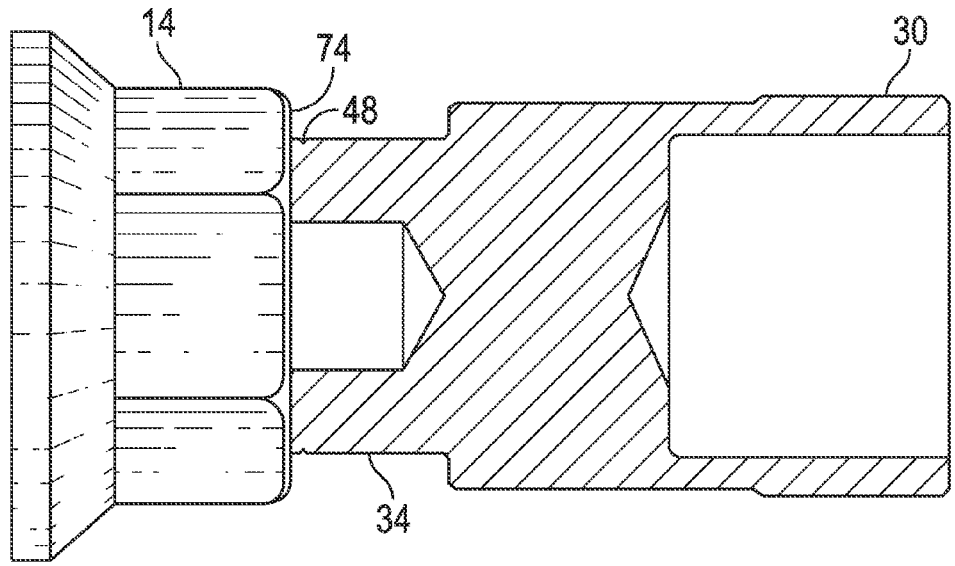
FIG. 6 is a schematic partial cross-sectional view of a multi-purpose gauge for a hub-piloted wheel assembly being used to determine if a wheel nut is bell-mouthed.

As shown in FIG. 6, the gauge 30 may be used to determine if a wheel nut 14 is bell-mouthed by attempting to insert the first section 34 of the gauge 30 into the top-side 74 of the wheel nut 14. If the gauge 30 enters the threaded section of the nut 14 deeper than the scribe line 48, then the nut 14 may be regarded as bell-mouthed. Bell-mouthing is a condition where the top-side 74 of the nut 14 at the threads opens up or widens. This condition causes a reduction in the engagement between the nut 14 and the stud 12, which may reduce the torque or clamp load that can be applied through the nut 14.

Figure 7:
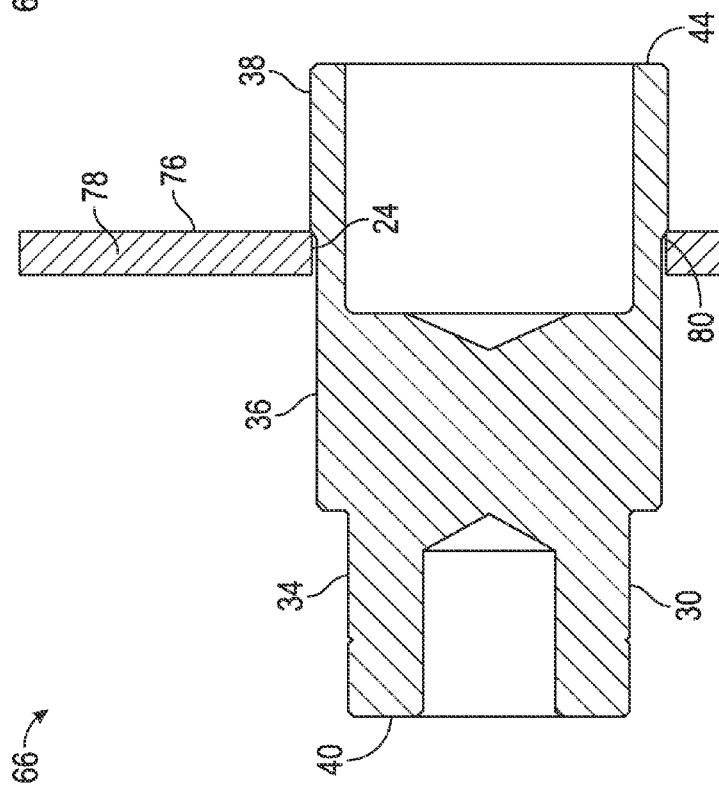
FIG. 7 is a schematic cross-sectional view of a multi-purpose gauge for a hub-piloted wheel assembly being used to determine if a bolt-hole opening in a wheel is eccentric or is obstructed by foreign material.

As shown in FIG. 7, the gauge 30 may be used to determine if a wheel bolt-hole opening 24 is eccentric (i.e., elongated or oblong, such as through wear and/or damage) by inserting both the first and second sections 34, 36 of the gauge 30 through the opening 24 (i.e., preferably from a reverse side 76), until the wheel disc 78 contacts the ledge 80 between the second and third sections 36, 38. If the bolt-hole opening 24 flushly contacts the second section 36 of the gauge 30 around the entire circumference, or has a uniform gap around the entire circumference, then the bolt-hole opening 24 is not eccentric. To facilitate this inspection, the ledge 80 may be angled between the second section 36 and the third section 38 so that it may self-center within the opening 24. Visual inspection may be aided by shining a bright light on the reverse side 76 of the wheel disc 78 to search for light leakage around the circumference of the gauge 30. If light is observed, then a technician may conclude that the bolt-hole opening 24 is not eccentric.

Figure 8:
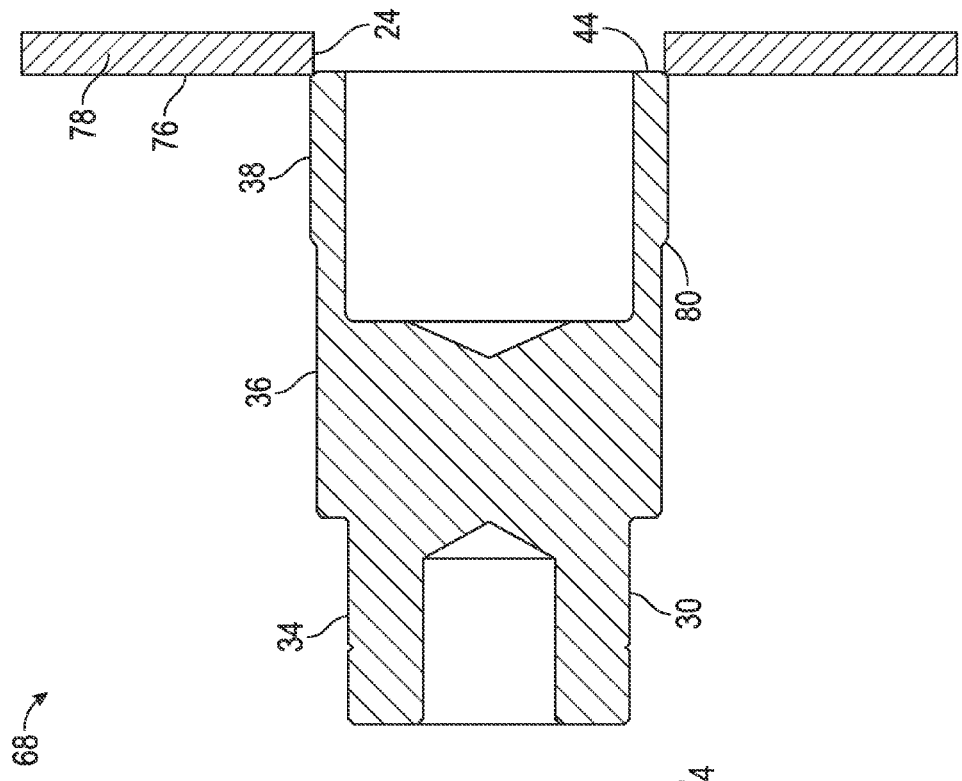
FIG. 8 is a schematic cross-sectional view of a multi-purpose gauge for a hub-piloted wheel assembly being used to determine if a bolt-hole opening in a wheel is over-diameter.

Finally, as shown in FIG. 8, the gauge 30 may be used to determine if a bolt-hole opening 24 is oversized by attempting to pass the third section 38 of the gauge 30 through the opening 24. This may be performed either as shown in FIG. 7 (i.e., by inserting the first and second sections 34, 36 through the opening 24 and examining whether the third section 38 is restricted from passing through the opening 24, or as shown in FIG. 8, where the end 44 of the third section 38 is attempted to be directly inserted through the opening 24. If the gauge 30 passes through the opening 24, though is circular, a technician may be encouraged to review the wheel specifications, as some wheels are intentionally manufactured with oversized bolt-hole openings 24 (despite industry recommendations to the contrary).

If the stud 12 is under-dimensioned, the stud 12 should be removed from the hub 20 and replaced. Similarly, if the nut 14 is over-dimensioned or bell-mouthed, it should be discarded and replaced. If the bolt-hole opening 24 in the wheel is eccentric, it should be replaced, and if there is an obstruction or interference present in or about the bolt-hole opening 24, it should be cleaned. Finally if the bolt-hole opening 24 in the wheel is over-dimensioned, specifications for the wheel should be reviewed, and the wheel should be replaced if the openings are unintentionally over-dimensioned.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of inspecting a truck wheel comprising:
   determining if a wheel stud is under-diameter by inserting a distal end portion of the wheel stud into a bore provided in a multi-purpose gauge;
   determining if a wheel nut is over-diameter by inserting a first section of the multi-purpose gauge into a first side of the wheel nut;
   determining if a wheel nut is bell-mouthed by inserting the first section of the multi-purpose gauge into a second side of the wheel nut; and
   determining if a bolt-hole opening in a wheel is eccentric by inserting a second section of the multi-purpose gauge into the bolt-hole opening.

2. The method of claim 1, further comprising determining if the bolt-hole opening in the wheel is oversized by inserting a third section of the multi-purpose gauge into the bolt-hole opening.

3. The method of claim 2, wherein the bore is provided in an end of the multi-purpose gauge defined by the third section.

4. The method of claim 1, further comprising:
   replacing the wheel stud if it is determined to be under-diameter;
   replacing the wheel nut if it is determined to be over-diameter; and
   replacing the wheel nut if it is determined to be bell-mouthed.

5. The method of claim 1, wherein determining if a wheel nut is over-diameter further includes comparing the position of an indicia disposed on a surface of the first section to a thread on the wheel nut.

6. The method of claim 1, wherein determining if a wheel nut is bell-mouthed further includes comparing the position of an indicia disposed on a surface of the first section to a thread on the wheel nut.

7. The method of claim 1, wherein determining if a wheel stud is under-diameter includes counting a number of threads on the distal end portion of the wheel stud that are inserted into the bore.

8. The method of claim 7, further comprising replacing the wheel stud if the number of threads that are inserted into the bore is greater than 4.

9. A multi-purpose gauge for inspecting a hub-piloted wheel assembly, the gauge comprising a unitary body that includes:
   means for determining an under-dimension of a wheel stud;
   means for determining an over-dimension of a wheel nut;
   means for determining bell-mouthing of a wheel nut; and means for determining if a bolt-hole opening in a wheel is eccentric.

10. The multi-purpose gauge of claim 9, further comprising a quick disconnect feature configured to selectively attach to the unitary body.

* * * * *